US010823599B2

(12) United States Patent
Talaski

(10) Patent No.: US 10,823,599 B2
(45) Date of Patent: *Nov. 3, 2020

(54) ELECTRO ACOUSTIC VOLUME MEASUREMENT

(71) Applicant: Michigan Scientific Corporation, Milford, MI (US)

(72) Inventor: Carl E. Talaski, Milford, MI (US)

(73) Assignee: Michigan Scientific Corporation, Milford, MI (US)

(*) Notice: Subject to any disclaimer, the term of this patent is extended or adjusted under 35 U.S.C. 154(b) by 291 days.

This patent is subject to a terminal disclaimer.

(21) Appl. No.: 15/987,803

(22) Filed: May 23, 2018

(65) Prior Publication Data

US 2018/0340811 A1 Nov. 29, 2018

Related U.S. Application Data

(60) Provisional application No. 62/509,884, filed on May 23, 2017.

(51) Int. Cl.
*G01F 22/00* (2006.01)
*G01F 23/296* (2006.01)
(Continued)

(52) U.S. Cl.
CPC .......... *G01F 22/00* (2013.01); *G01F 23/2966* (2013.01); *H04R 1/025* (2013.01);
(Continued)

(58) Field of Classification Search
CPC combination set(s) only.
See application file for complete search history.

(56) References Cited

U.S. PATENT DOCUMENTS

| 3,075,382 A | * | 1/1963 | Mathias | G01F 17/00 |
| | | | | 73/149 |
| 4,991,433 A | | 2/1991 | Warnaka et al. | |
| 5,824,892 A | * | 10/1998 | Ishii | G01F 17/00 |
| | | | | 73/149 |

FOREIGN PATENT DOCUMENTS

| JP | S60-076623 A | 5/1985 |
| JP | S61-173119 A | 8/1986 |
| JP | H02-064418 A | 3/1990 |

OTHER PUBLICATIONS

International Search Report and Written Opinion in corresponding application PCT/US2018/034237, dated Aug. 9, 2018, 7 pgs.

* cited by examiner

*Primary Examiner* — Xin Y Zhong
(74) *Attorney, Agent, or Firm* — Young Basile Hanlon & MacFarlane, P.C.

(57) ABSTRACT

Electro acoustic volume measurement of a gas in a housing space may be performed using a hollow tube having a first end and a second end. A speaker is arranged to emit audio signals through the hollow tube. A first microphone of at least two microphones is located at the first end of the hollow tube, while a second microphone is located a defined distance from the first microphone within the hollow tube. A voltage-controlled oscillator controls the frequency of the audio signals to a resonance frequency where signals of the first microphone and the second microphone are 90 degrees out of phase while the first end of the hollow tube is located within the housing. The resonance frequency indicates a volume of the gas. The resonance frequency may be temperature-adjusted, or the volume may be temperature-adjusted.

20 Claims, 16 Drawing Sheets

(51) Int. Cl.
*H04R 1/02* (2006.01)
*H04R 1/40* (2006.01)
*H04R 3/04* (2006.01)
*H04R 29/00* (2006.01)
*H04R 3/00* (2006.01)

(52) U.S. Cl.
CPC ............ *H04R 1/028* (2013.01); *H04R 1/403* (2013.01); *H04R 1/406* (2013.01); *H04R 3/04* (2013.01); *H04R 29/00* (2013.01); *H04R 3/00* (2013.01); *H04R 2400/00* (2013.01); *H04R 2410/00* (2013.01)

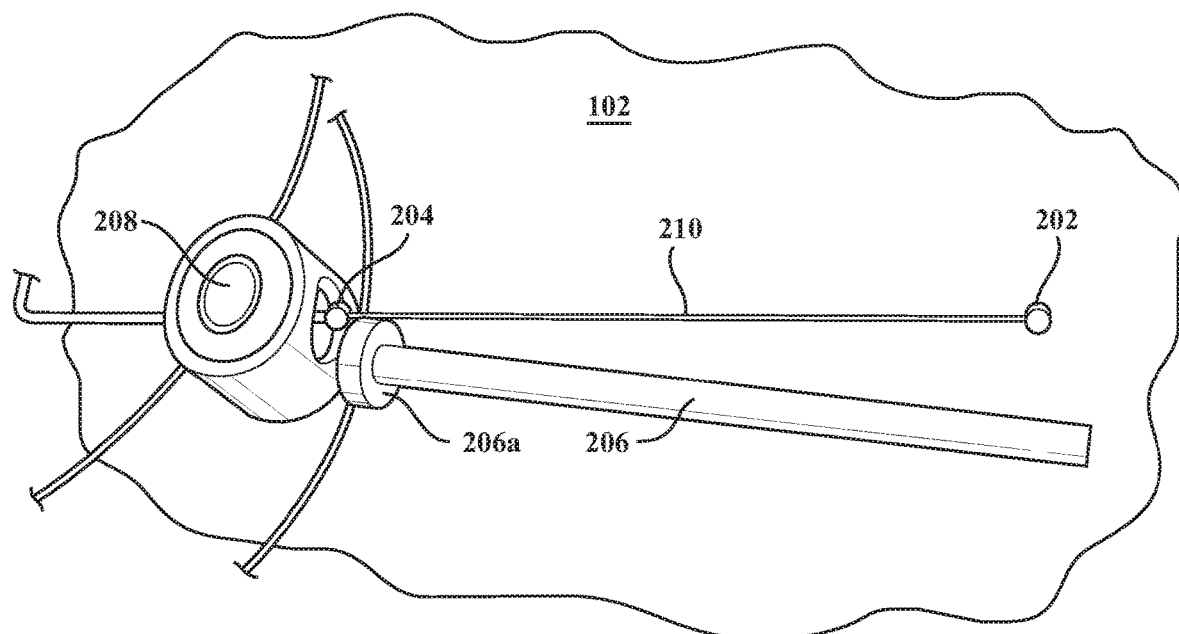
FIG. 2A
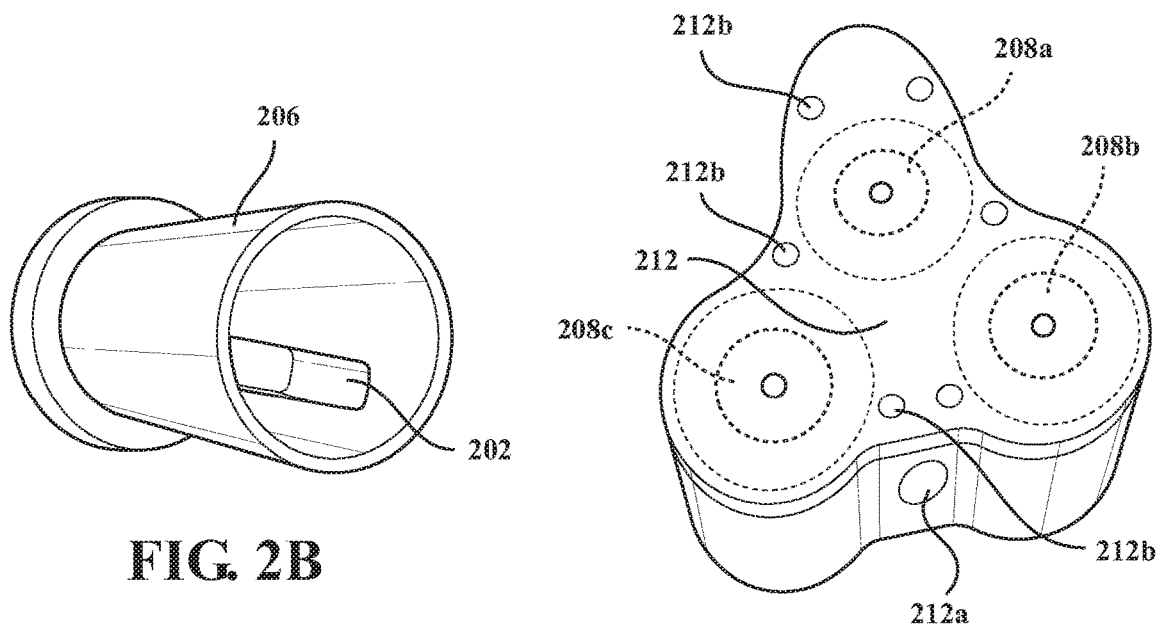
FIG. 2B
FIG. 2C

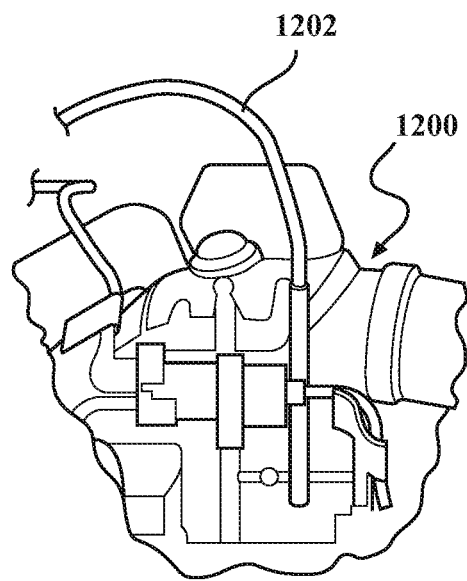
FIG. 12
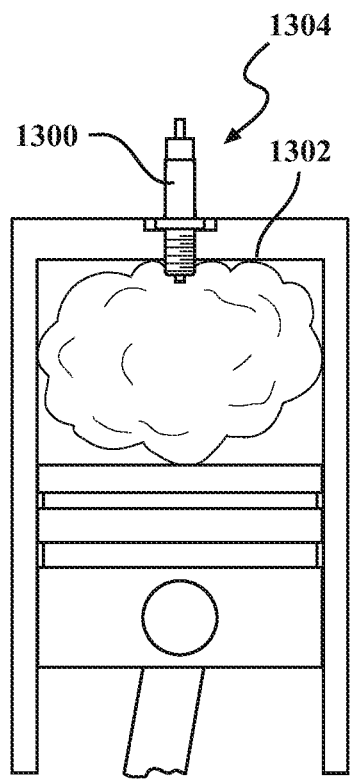 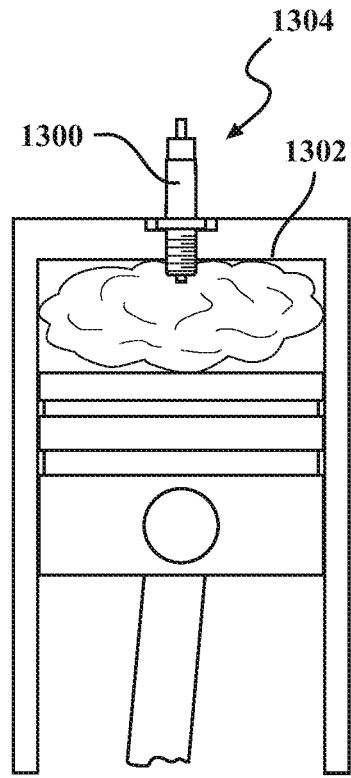
FIG. 13A  FIG. 13B

ELECTRO ACOUSTIC VOLUME MEASUREMENT

CROSS REFERENCE TO RELATED APPLICATIONS

This application claims the benefit of U.S. Provisional Application No. 62/509,884, filed May 23, 2017, the contents of which are incorporated by reference herein in its entirety.

TECHNICAL FIELD

The disclosure relates generally to the measurement of a volume of gas using an electro acoustic volume measurement.

BACKGROUND

Measurement of a volume of gas can be desirable in several applications. For example, the measurement of the volume above a piston of an internal combustion engine may be used to tune an engine.

Various techniques have been used to do such a measurement. A low-cost technique is a liquid pour. However, the liquid pour technique is low in precision and accuracy, time consuming, and requires disassembly of the engine. Another technique is referred to as an optical technique. While the optical technique is highly precise and accurate, it is relatively high in cost and time consuming. Further, the optical technique also involves disassembly of the engine.

BRIEF SUMMARY

The techniques described herein include an electro acoustic volume measurement of a volume of gas within a housing (e.g., any enclosed space) that requires no disassembly and exhibits high accuracy and precision. Further, the techniques described herein are portable and easy to use and, compared to other techniques, are relatively inexpensive.

One example of an apparatus for electro acoustic volume measurement includes a hollow tube having a first end and a second end and a speaker arranged to emit audio signals through the hollow tube. At least two microphones are also included where a first microphone of the at least two microphones is located at the first end of the hollow tube, and a second microphone of the at least two microphones is located a defined distance towards the second end from the first microphone within the hollow tube. A voltage-controlled oscillator controls the frequency of the audio signals to a resonance frequency where signals of the first microphone and the second microphone are 90 degrees out of phase while the first end of the hollow tube is located within a housing.

One example of a method for electro acoustic volume measurement includes inserting a hollow tube having a first end and a second end into a housing space such that the first end of the hollow tube is located within the hollow tube, a first microphone of at least two microphones is located at the first end of the hollow tube, and a second microphone of the at least two microphones is located a defined distance towards the second end from the first microphone within the hollow tube. The method also includes emitting audio signals through the hollow tube using a speaker while controlling, by a voltage-controlled oscillator, the frequency of the audio signals to a resonance frequency where signals of the first microphone and the second microphone are 90 degrees out of phase.

In these examples, the resonance frequency is calibrated to a volume of the housing. That is, knowing the resonance frequency, the volume of a gas within the housing is known.

Variations of these implementations, and additional implementations, are described in additional detail below with reference to the drawing figures and claims.

BRIEF DESCRIPTION OF THE DRAWINGS

The various features, advantages and other uses of the present disclosure will become more apparent by referring to the following detailed description and drawing figures. In the figures, like reference numbers refer to like elements unless otherwise stated. Moreover, the figures are not necessarily drawn to scale.

FIG. 2A shows an example of a probe of a device or apparatus for electro acoustic volume measurement according to the present disclosure.

FIG. 2B shows the placement of a volume end microphone within a tube or pipe of the probe of FIG. 2A.

FIG. 2C shows an example of a speaker array that may be used with the probe of FIG. 2A.

FIG. 12 shows a perspective view of use of a device or apparatus for electro acoustic volume measurement according to the present disclosure.

FIGS. 13A and 13B show cross-sectional, side views that illustrate measurement of the compression ratio of an internal combustion engine using the apparatus of FIG. 12.

DETAILED DESCRIPTION

The frequency of an acoustic Helmholtz resonator is dependent on the compliance of gas in a volume (e.g., a housing) in combination with the acoustic mass of a gas in a pipe terminating in the volume. Based on this realization, a pseudo resonance is excited that is dependent on the mass of the gas located between two microphones, one of which is located at the volume end of the pipe and the other that is located nearer an acoustic source (e.g., a speaker). Resonance is defined as the frequency at which sound pressure at the two microphones is 90 degrees out of phase. A phase detector may electronically multiply the two microphone signals, thereby forming a product. The product has an average value of zero when the two microphone signals are 90 degrees out of phase. An absolute non-zero average value for the product occurs when the phase differs from 90 degrees out of phase.

The electronic circuitry herein may use a voltage-controlled oscillator (VCO) that has a frequency determined by the integral of the product. The integral of the product will change in a direction to bring the VCO frequency to the value where the 90-degree relationship exists. Thus, the oscillator can seek out and remain at the acoustical pseudo-resonant frequency. This frequency is also referred to as the resonance frequency herein. Values for the acoustical pseudo-resonant frequency are calibrated to volume values. Hence, measurement of the volume is achieved.

Figure 1A:
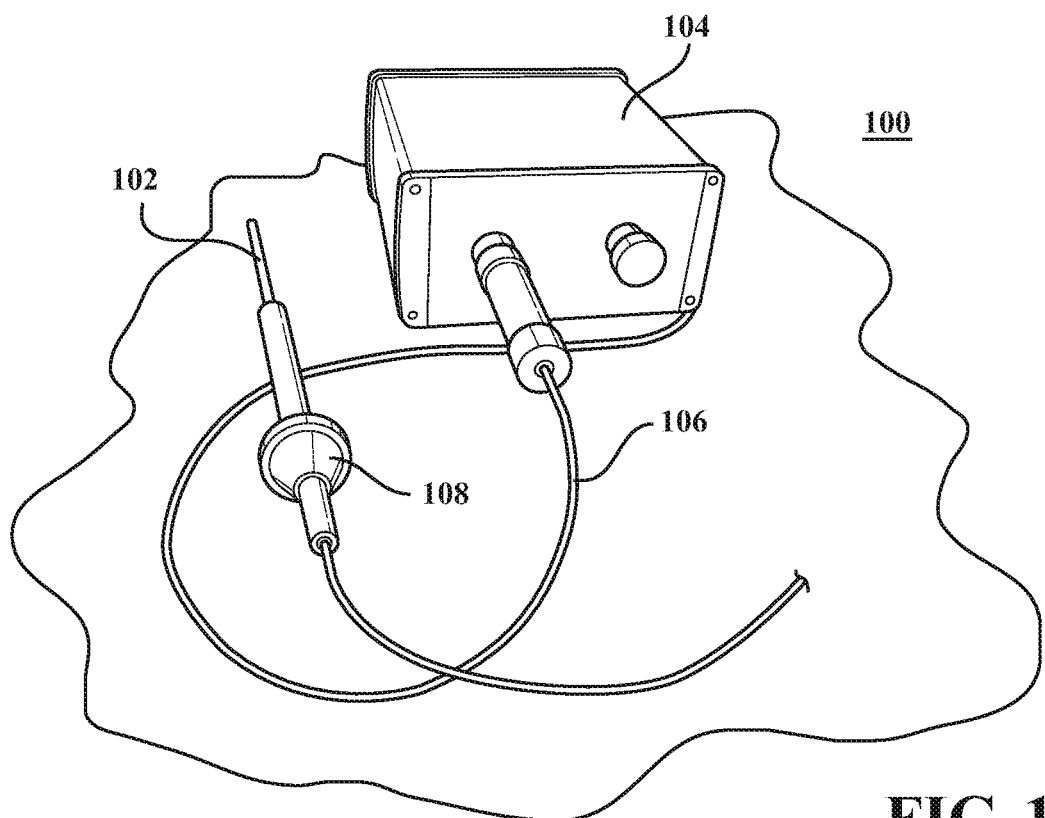
FIGS. 1A and 1B show an example of a device or apparatus for electro acoustic volume measurement according to the present disclosure.
Figure 1B:
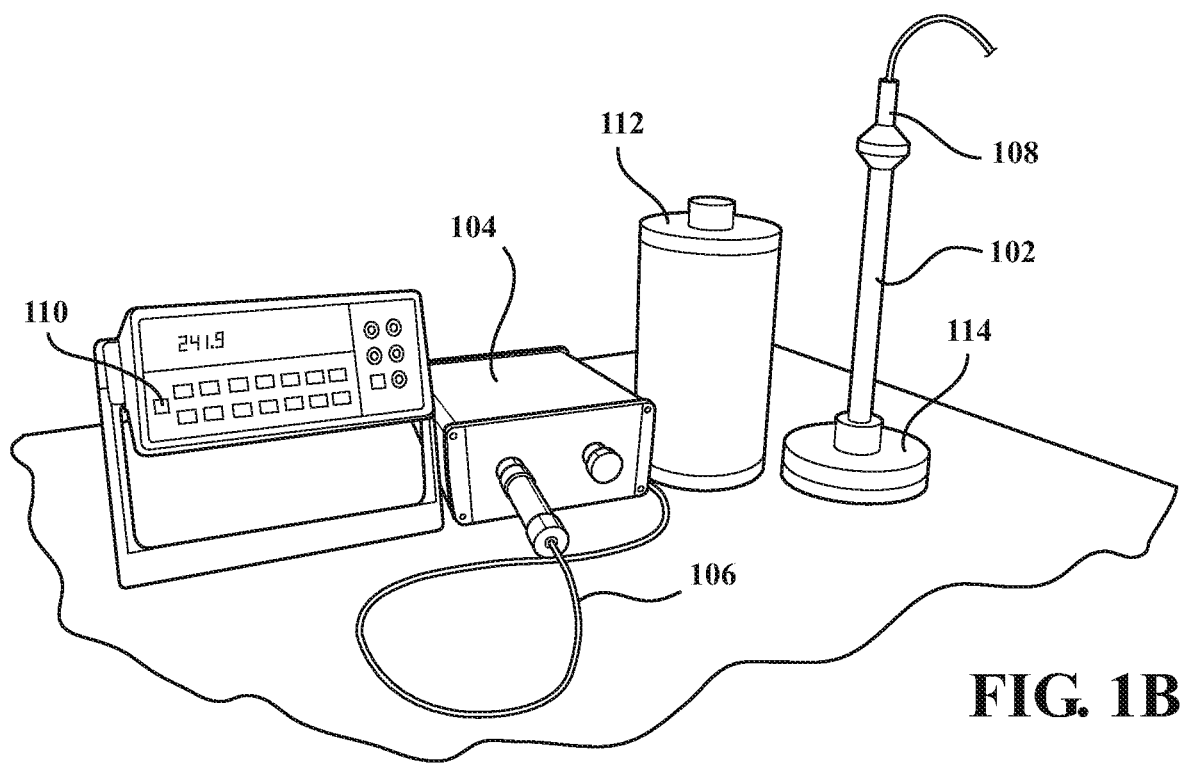

FIGS. 1A and 1B show an example of a device or apparatus 100 for electro acoustic volume measurement according to implementations of the present disclosure. The apparatus 100 comprises a probe 102 and electronic circuitry within a housing 104. The housing 104 may include a display that can display the volume measured by the apparatus 100. A connector (e.g., a cable) 106 may be used to couple the probe 102 to the electronic circuitry within the housing 104. A speaker housing 108 houses a speaker for emitting audio signals at one end of the probe 102 and optionally forms a relatively air-tight seal with an enclosed space during measurements.

FIG. 1B includes, in place of a display in a surface of the housing 104, an oscilloscope 110 electronically coupled to the electronic circuitry. The oscilloscope 110 includes a display showing a frequency output from the apparatus 100. FIG. 1B also includes two calibration devices 112, 114, each having an enclosed space with a known volume of gas. As shown, the probe 102 is inserted in the calibration device 114. Accordingly, the frequency output displayed by the oscilloscope 110 is a resonance frequency as described in additional detail below. Using several calibration devices, such as the calibration devices 112, 114, the resonance frequency may be calibrated to the known volumes of the enclosed spaces of the respective calibration devices. In this example, the displayed resonance frequency corresponds to the known volume of the calibration device 114.

Note that while the electronic circuitry is described as being located within the housing 104, some of the electronic circuitry may be located within the probe 102. Alternatively, the probe 102 may be self-contained (i.e., all of the electronic circuitry may be located within or integrally attached to the probe 102). A self-contained probe is particularly useful for a digital implementation of the electronic circuitry of the apparatus 100 as described in additional detail below.

FIG. 2A shows an example of a probe 102 of the apparatus 100 of FIGS. 1A and 1B. The probe 102 is disassembled for clarity. As can be seen in FIG. 2A, the probe 102 may use two small microphones 202, 204 housed within a tube having an outer diameter sized to fit within an opening to the enclosed space/area being measured. The tube may be referred to as a pipe 206 herein, and the pipe 206 has a first end and a second end. One microphone 202 is located at the unknown volume end (the first end) of the pipe 206. The other microphone 204 is located at a defined distance toward the second end of the pipe 206. The microphone 204 may be a quadrature microphone. The speaker housing 108 is omitted in FIG. 2A to show a speaker 208 located in acoustical connection with the second end of the pipe 206. That is, the speaker 208 is arranged near the second end of the pipe 206 so that audio signals emitted from the speaker 208 pass through the pipe 206. Due to the location of the speaker 208 at the second end of the pipe 206, the second end of the pipe 206 may be referred to as the speaker end. For easy assembly, and in order to securely support the microphones 202, 204 within the pipe 206, each of the microphones 202, 204 may be secured to a thin, rigid wire 210. The pipe 206 fits over the microphones 202, 204 and the wire 210 and may have a flange 206a at the second end that engages with an opening in the speaker housing 108 (not shown in FIG. 2A). The flange 206a may be force fit with the speaker housing 108, or may be secured by glue or another component, either semi-permanently or removably, with the speaker housing 108. The placement of the microphone 202 at the first, volume end of the pipe 206 with the probe 102 assembled is shown in FIG. 2B.

Figure 2D:
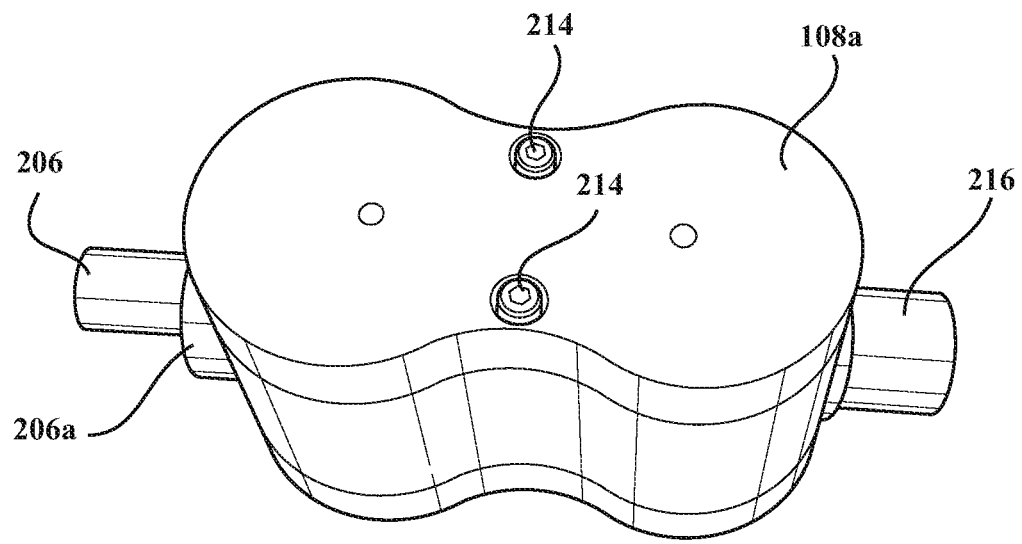
FIG. 2D shows an example of a speaker housing for a two-speaker array that may be used with the probe of FIG. 2A.

The speaker 208 is a single, passive speaker in this example. However, multiple speakers may be used, wired in series and/or in parallel into a speaker array to obtain a desired audio signal strength. One example of a speaker array is shown in FIG. 2C. In FIG. 2C, three speakers 208a, 208b, 208c are mounted within a wiring housing 212. The wiring housing 212 may have an opening 212a coincident with a speaker housing through which audio signals can pass through the pipe 206 and has openings 212b to secure the wiring housing 212 to a speaker housing. As can be seen from FIG. 2D, depending upon the shape of the speaker or speaker array, the speaker housing 108 can change. The speaker housing 108a in FIG. 2D is designed to support a two-speaker array. A wiring housing, similar to the wiring housing 212, fits within a cavity of the speaker housing 108a, and may be secured by screws 214 extending into openings in the wiring housing, similar to the openings 212b, and into openings in the speaker housing 108a. A mount 216 for engagement with the connector 106 is at an end of the speaker housing 108a opposite from where the pipe 206 is affixed to the speaker housing 108a.

Figure 2E:
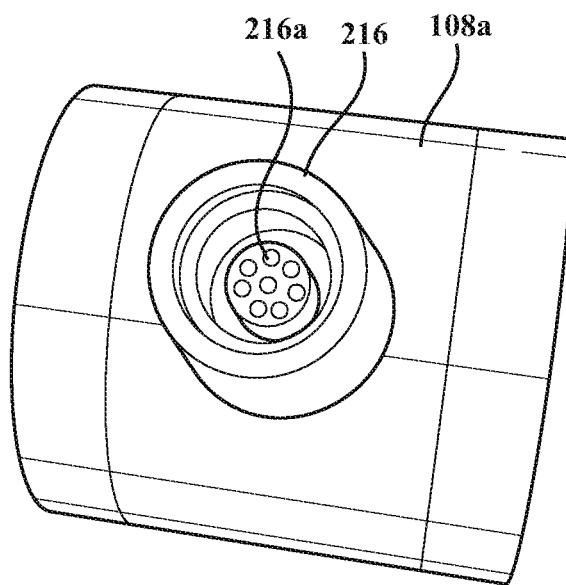
FIG. 2E shows a close-up of a mount of the speaker housing of FIG. 2D.

A close-up view of the mount 216 of the speaker housing 108a is shown in FIG. 2E. Inside of the mount 216 is a female coupling 216a into which the connector 106 may be securely mounted.

The distance between the microphones 202, 204 defines the equivalent pipe-length of a Helmholtz resonator, the frequency of which is given by the equation below:

$$\text{frequency} = (\text{speed of sound}/2*\pi)* \sqrt{\text{pipearea}/(\text{pipelength}*\text{volume})}$$

In the equation, the pipe area is the hollow area within the pipe 206 that encompasses the microphones 202, 204, and the pipe length is the distance between the microphones 202, 204. The distance may be selected based on the expected volume(s) to be measured by the apparatus 100 and the size of the enclosed space(s) as next discussed.

Broadly, the electronic circuitry can include a VCO. The VCO comprises, in an example, a self-tuning sine wave oscillator and a 90-degree phase detector. The integrated product of the signals of the two microphones 202, 204 is minimized. When the two signals are 90 degrees out of phase, the average value of the product is zero. Accordingly, the frequency is stable.

A couple of effects influence the frequency range over which this approach is practical. First, it is difficult to generate practical sound pressure levels at low frequencies with small speakers. Second, avoiding a standing wave (non-Helmholtz) mode resulting from the physical length of the pipe 206 is desirably avoided. In an example herein where the desired range is 10 to 1200 cc, the distance between the microphones 202, 204 is selected to get the frequency with a volume of 1200 cc above 30 Hz to address the first effect. Further, a defined distance between the microphones 202, 204 is selected so as to keep the Helmholtz mode with a volume of 10 cc below 400 Hz to address the second effect. Given a pipe diameter suitable for piston housings, the distance may be 3 to 4 cm, inclusive.

The length (and area) of the pipe 206 is not particularly limited so long as it can produce a desired frequency range for the expected volumes while addressing the two effects above. Although two microphones 202, 204 are shown, it is possible for two groups of microphones to be used.

Figure 3:
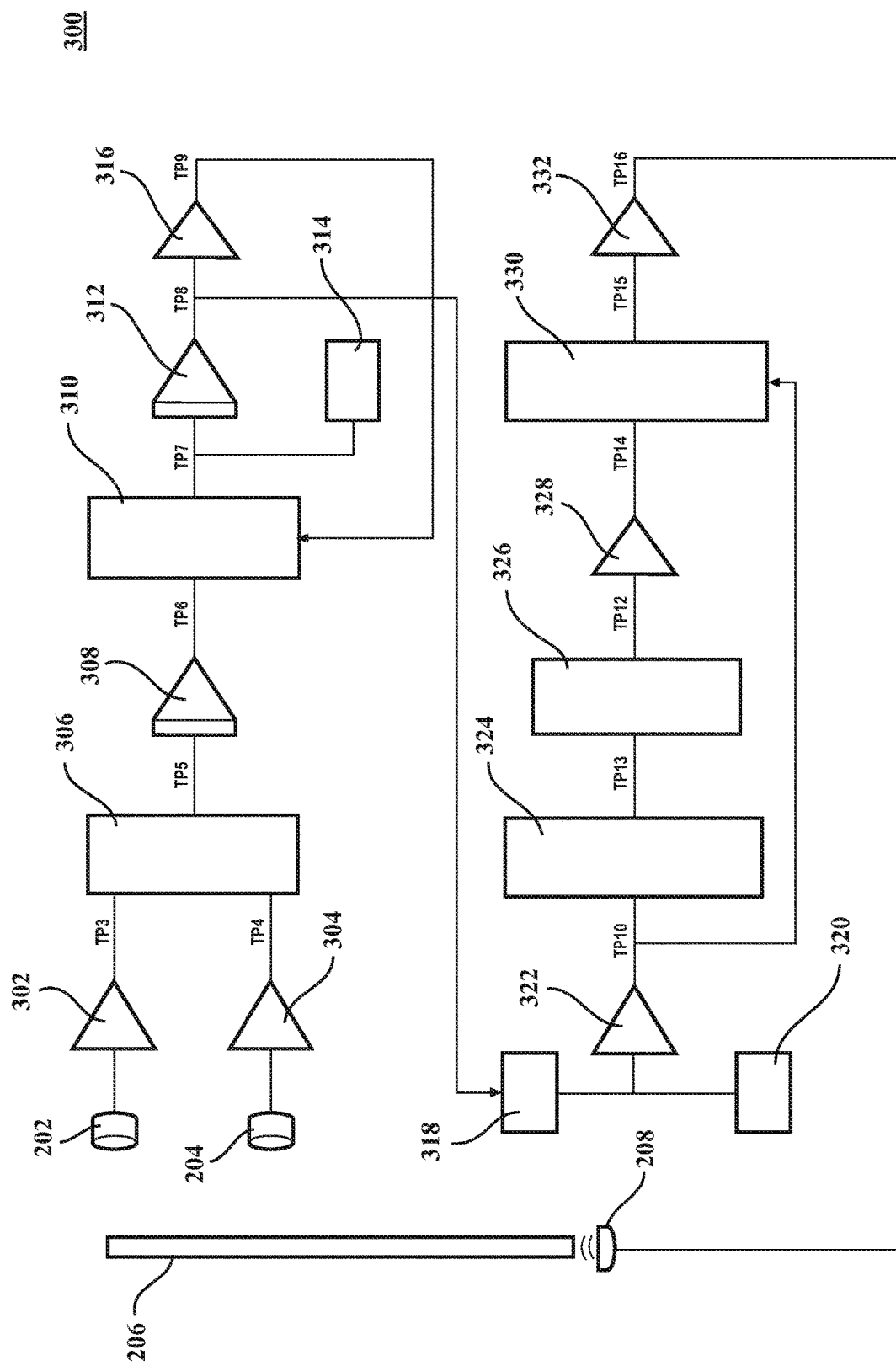
FIG. 3 shows a block diagram of one implementation of analog electronic circuitry of a device or apparatus for electro acoustic volume measurement according to the present disclosure.

FIG. 3 shows a schematic diagram of one example of electronic circuitry 300 of the apparatus 100 of FIG. 1. This electronic circuitry 300 implements an analog solution for an electro acoustic volume measurement.

Signals from the microphones 202, 204 are supplied to respective amplifier circuits or amplifiers 302, 304. The amplified microphone signals are multiplied at a multiplier circuit or multiplier 306, and the product of the microphone signals is output to an integrator 308. The integrator 308 outputs an average voltage proportional to the frequency of the audio signals, which average voltage is an input to a voltage-controlled oscillator formed of a waveform generator, a modulator, a linear-to-sine converter, and a de-modulator. The integral of the product changes in a direction to bring the VCO frequency to a value where a 90-degree relationship exists between the microphone signals. In this way, the VCO settles at an acoustical pseudo-resonant (also referred to as a resonance) frequency that corresponds to the volume being measured.

In general, the waveform generator receives a voltage signal proportional to the frequency between the signals of the first microphone and the signals from the second microphone, and generates a waveform input for the VCO. The waveform input can be a triangular wave.

As shown, the waveform generator comprises a second multiplier 310, a second integrator 312, a symmetry circuit 314, and a limiter 316. The average voltage from the integrator 308 is one input to the second multiplier 310. The other input to the second multiplier 310 is a square-wave feedback signal from the limiter 316. The output of the second multiplier 310 is a square wave with a peak-to-peak value proportional to the frequency of the audio signals. The square wave is supplied as an input signal to the second integrator 312, along with input from the symmetry circuit 314 that adjusts the level of the integrated signal, to produce a constant amplitude triangular wave that is input to the limiter 316.

The output of the waveform generator (i.e., the constant amplitude triangular wave output from the second integrator 312) has a frequency that moves the previous frequency of the audio signals from the speaker 208 closer to the resonance frequency. The next portion of the electronic circuitry 300 converts the constant amplitude triangular wave output from the second integrator 312 to a sine wave at the new frequency that is a control signal for the speaker 208.

Specifically, a level circuit 318 adjusts the magnitude of the triangular wave output for input to an amplifier 322. The second input to the amplifier 322 is a balancing voltage from a balance circuit 320. The output of the amplifier 322 is supplied to the modulator of the VCO, also referred to as a multiplexer frequency doubler 324, and to the de-modulator of the VCO, also referred to as a multiplexer halve-sine to sine converter 330. The modulated output of the multiplexer frequency doubler 324 is fed through the linear-to-sine converter 326 of the VCO. The output of the linear-to-sine converter 326 is amplified through a second amplifier 328 before providing a second input to the multiplexer halve-sine to sine converter 330.

The output of the multiplexer halve-sine to sine converter 330 is a sine wave that is amplified by a third amplifier 332. The output of the third amplifier 332 controls the speaker 208 or a speaker array. Once the probe 102 is inserted into a volume to be measured and a signal is initially applied to the speaker 208, the electronic circuitry of FIG. 3 may operate for several cycles before settling at a resonance frequency corresponding to the volume being measured.

Figure 4A:
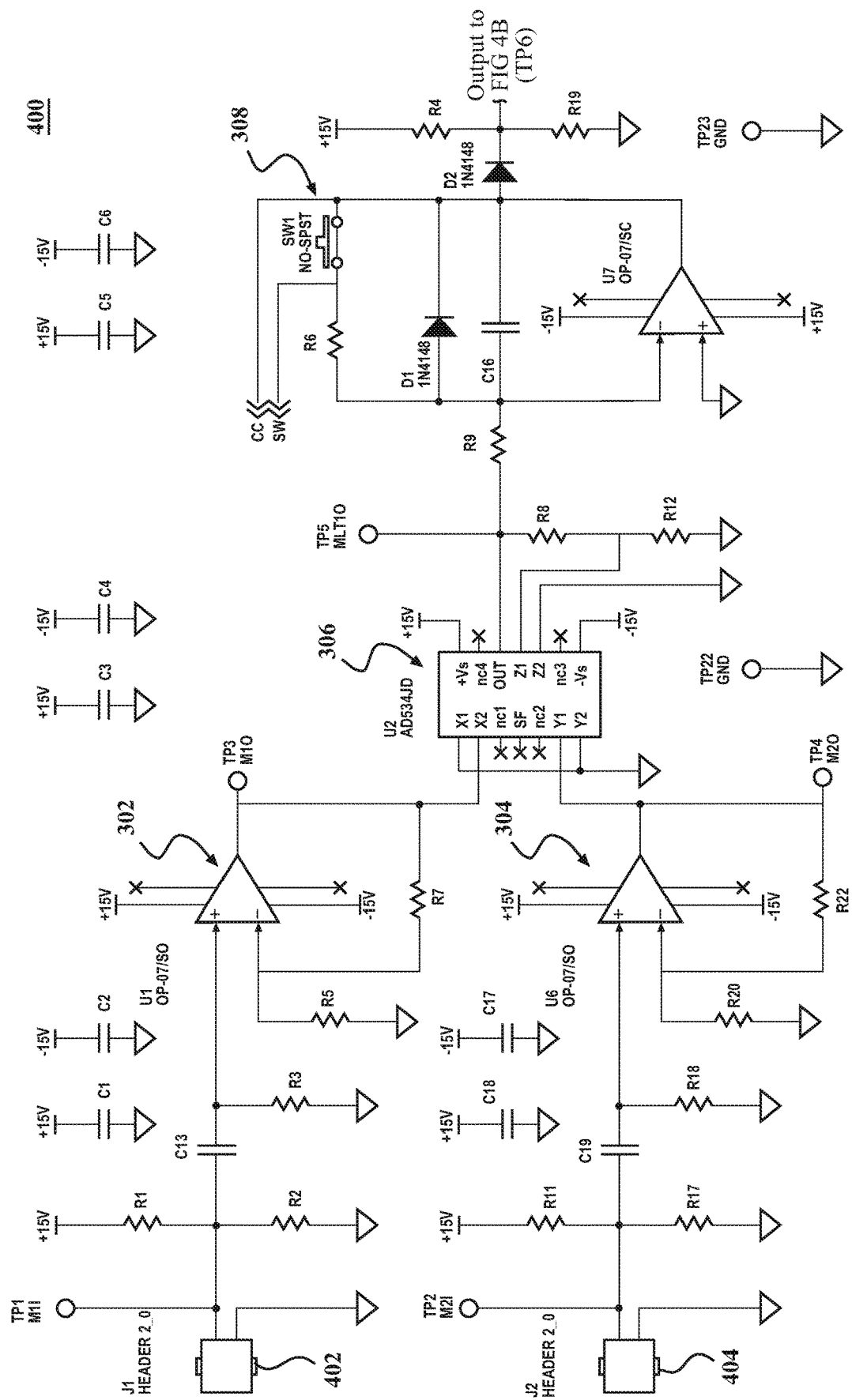
FIGS. 4A-4D show a detailed schematic diagram of the electronic circuitry of FIG. 3.
Figure 4B:
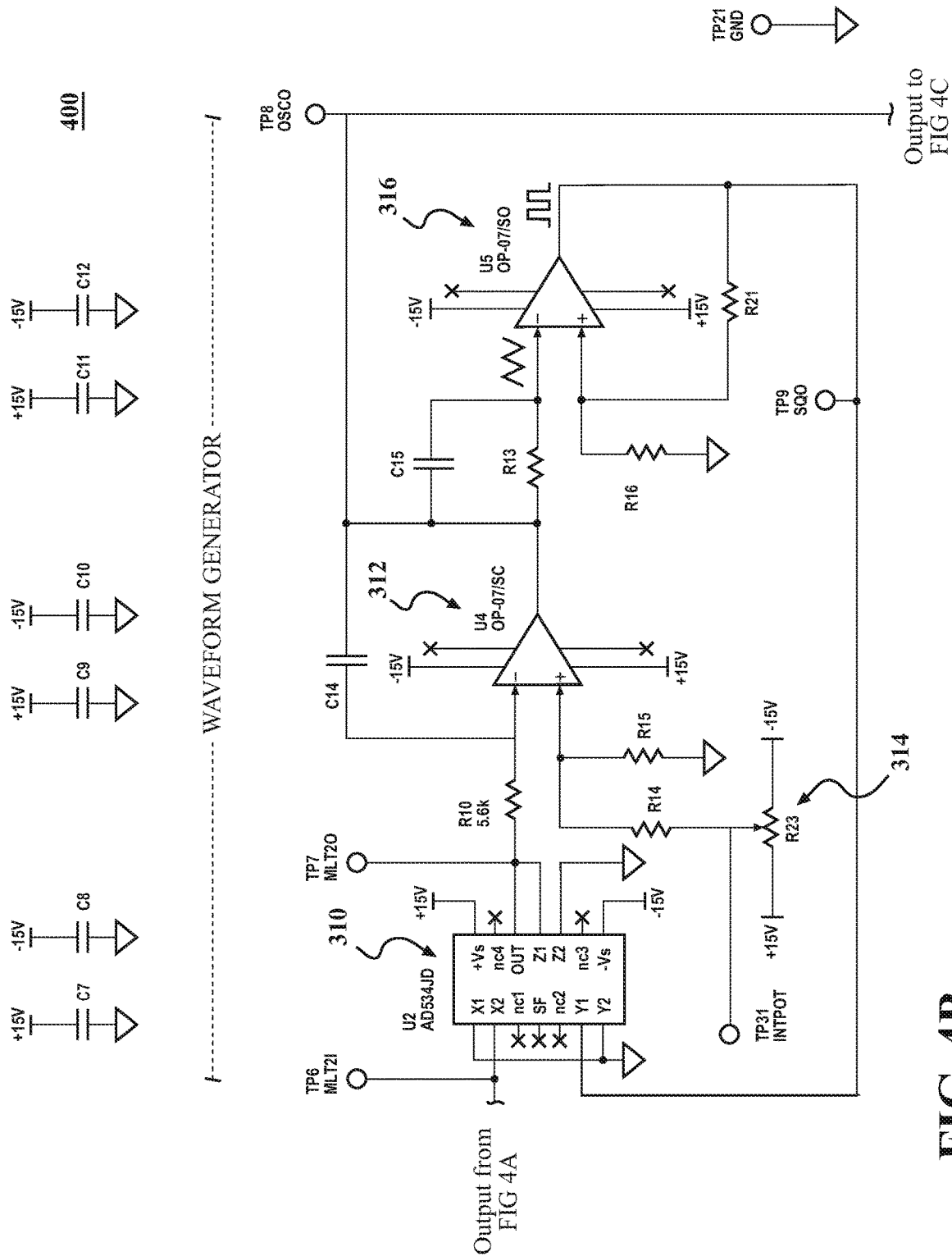
Figure 4C:
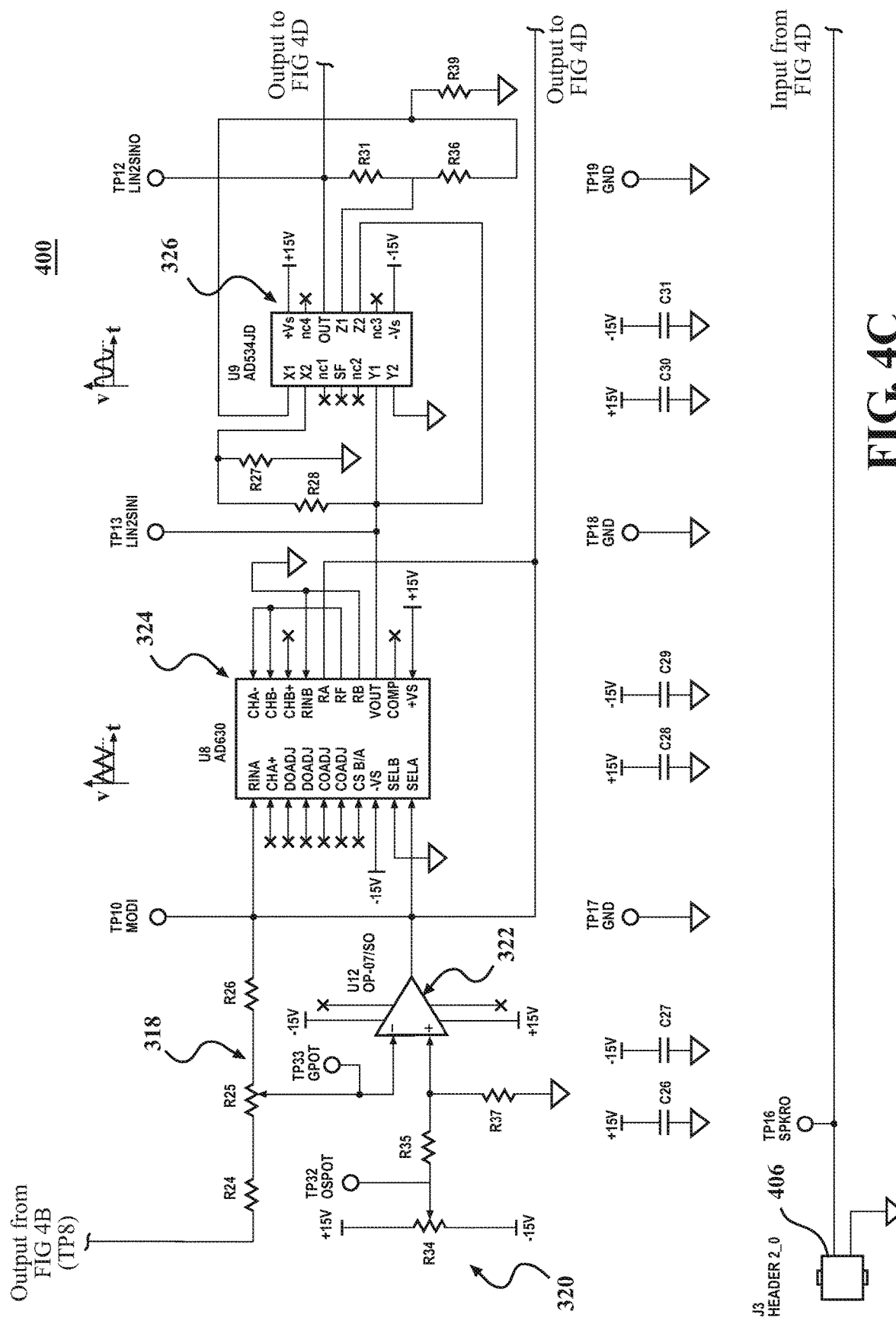
Figure 4D:
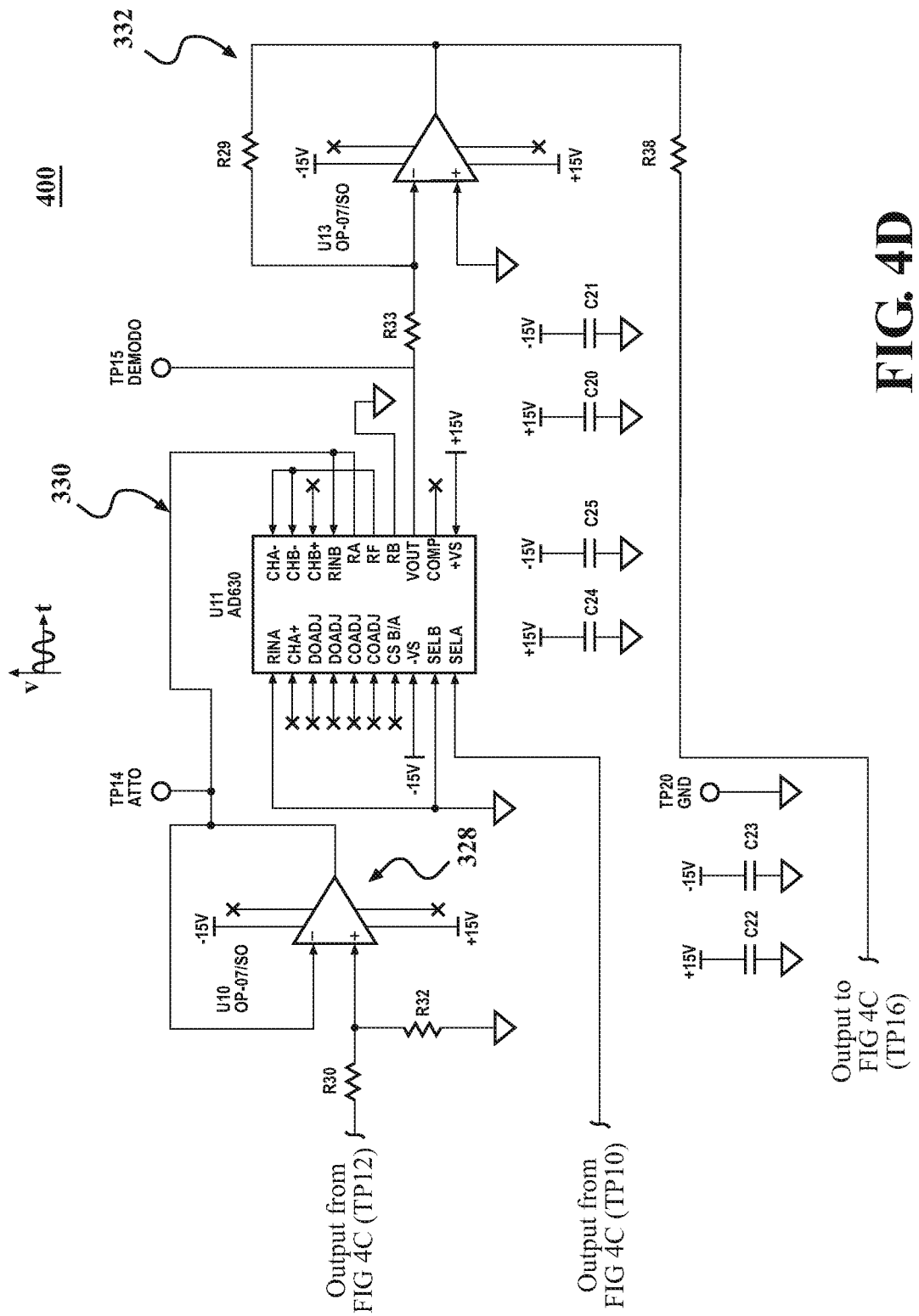

FIGS. 4A-4D show a detailed schematic diagram of the electronic circuitry of FIG. 3. In these figures, positions labeled "TP" correspond to the same positions and hence the same signals within FIG. 3. For example, TP3 and TP4 represent the amplified microphone signals from the amplifiers 302, 304. In FIG. 4A, the input connector J1 402 and the input connector J2 404 are respectively coupled to microphones, in this example microphones 202, 204, and in the input connector J3 406 is coupled to a speaker, in this example the speaker 208.

The multipliers 306 and 310 may each be an internally trimmed precision IC multiplier. A possible implementation may use part AD534, available from Analog Devices, Inc. (ADI) of Norwood, Mass. In this case, the product of the microphone signals at the multiplier 306 is OUT=1.1*X2*Y1. In the integrator 308, diode D1 clamps the voltage output at greater than or equal to ref+Vd, and the output of the second multiplier 310 is OUT=X2*Y1.

As mentioned above, the multiplexer frequency doubler 324 and the multiplexer halve-sine to sine converter 330 of the VCO respectively form a modulator and a de-modulator. A possible implementation may use, for each, a high precision balanced modulator/demodulator, such as part AD630, available from ADI. The linear-to-sine converter 326 of the VCO may be formed of any number of components. In the example shown, linear-to-sine converter 326 is formed of part AD534, available from ADI.

Figure 5:
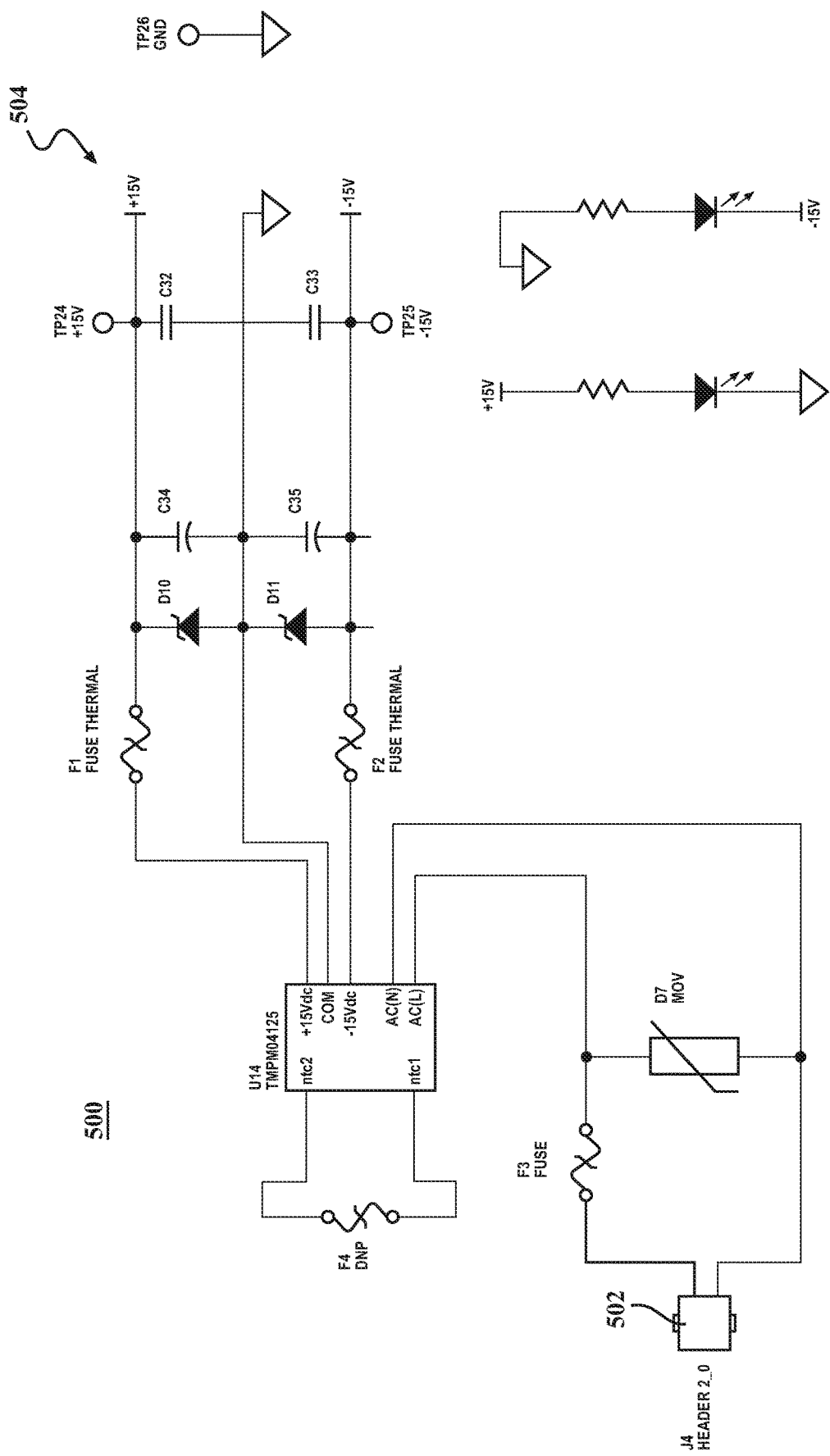
FIG. 5 shows a schematic diagram of one implementation of power circuitry for the electronic circuitry of FIGS. 4A-4D.

FIG. 5 shows a schematic diagram of one implementation of power circuitry (a power source) 500 for the electronic circuitry 400 of FIGS. 4A-4D. The particular design of the power source 500 can vary as long as it provides sufficient power to control the speaker or speaker array, including control of the electronic circuitry 400 that causes the speaker or speaker array to emit audio signals. The power source 500 is, as an example, a ±15V/4 W AC/DC power supply. The power source 500 may receive AC power through the input connector J4 502. One power module that can be used to produce the DC power at the output 504 part TMPM 04215 from Traco Power North America, Inc. of San Jose, Calif.

Figure 6:
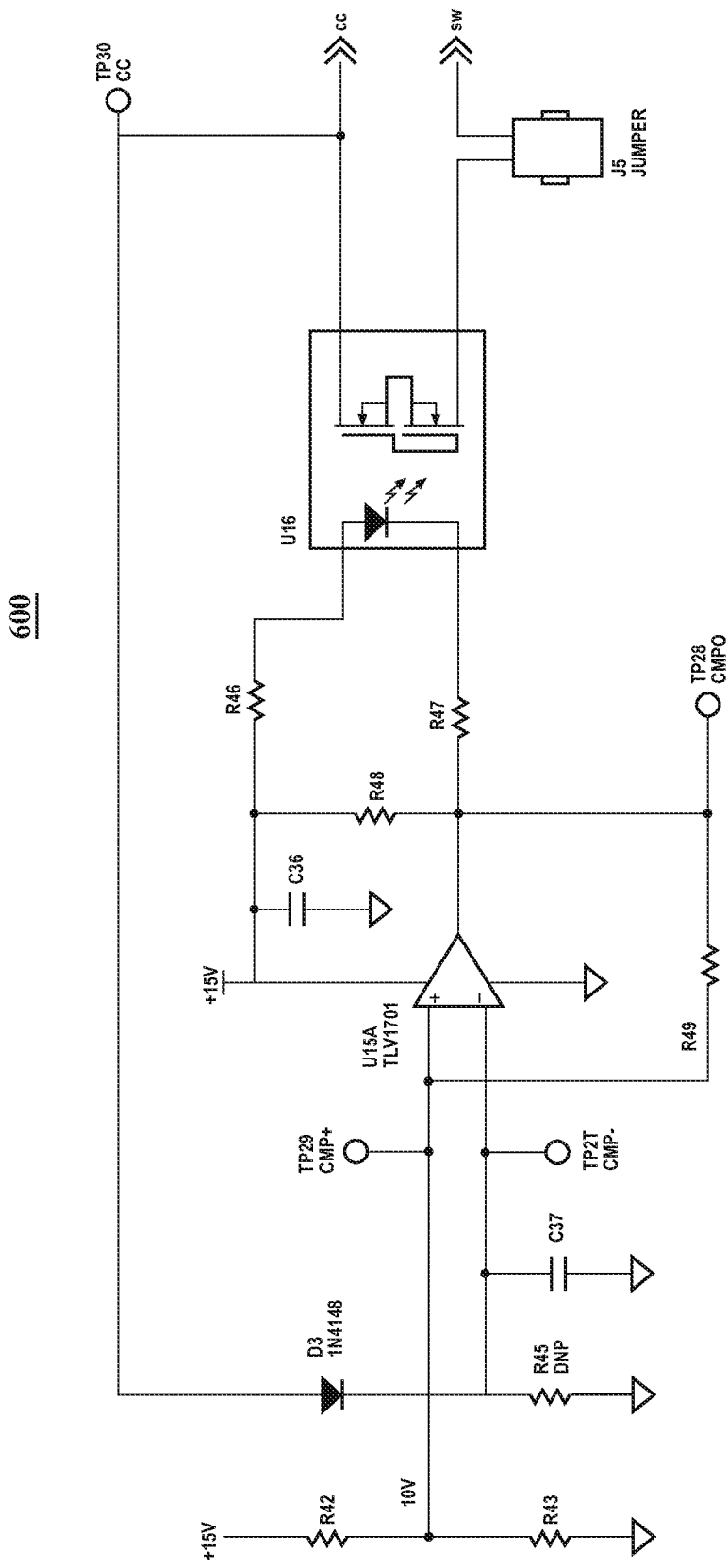
FIG. 6 shows a schematic diagram of optional reset switch circuitry for the electronic circuitry of FIGS. 4A-4D.

FIG. 6 shows a schematic diagram of optional reset switch circuitry 600 for the electronic circuitry 400 of FIGS. 4A-4D. The reset switch circuitry 600 may be powered by the power source 500, and may be used to reset the electronic circuitry 400 for the determination of a resonance frequency (and hence a volume).

As mentioned, the frequency output values for the electronic circuitry 400 are calibrated to volume values. That is, respective values of the resonance frequency correspond to different volumes for the gas. However, a volume value can vary for the same frequency output value when temperature values are different from those used at the time of calibration. Accordingly, the electronic circuitry can include a temperature sensor that detects the temperature when measurements are made to modify the volume determined by the calibration based on the temperature measured as compared to the temperature used for the calibration. Alternatively, the temperature may be used as an input to select one of a number of calibration values for the volume pre-determined using different temperatures. The temperature sensor (described in more detail below) may be mounted within the pipe 206 or within the speaker housing, such as the speaker housing 108a.

A digital implementation using a variable-frequency, sine-wave source, a phase detector, and an integrator is also possible. A schematic diagram of one digital implementation is shown in FIGS. 7-11. In this example, the electrical circuitry may be located within the probe, instead of within a housing spaced from the probe.

Figure 7:
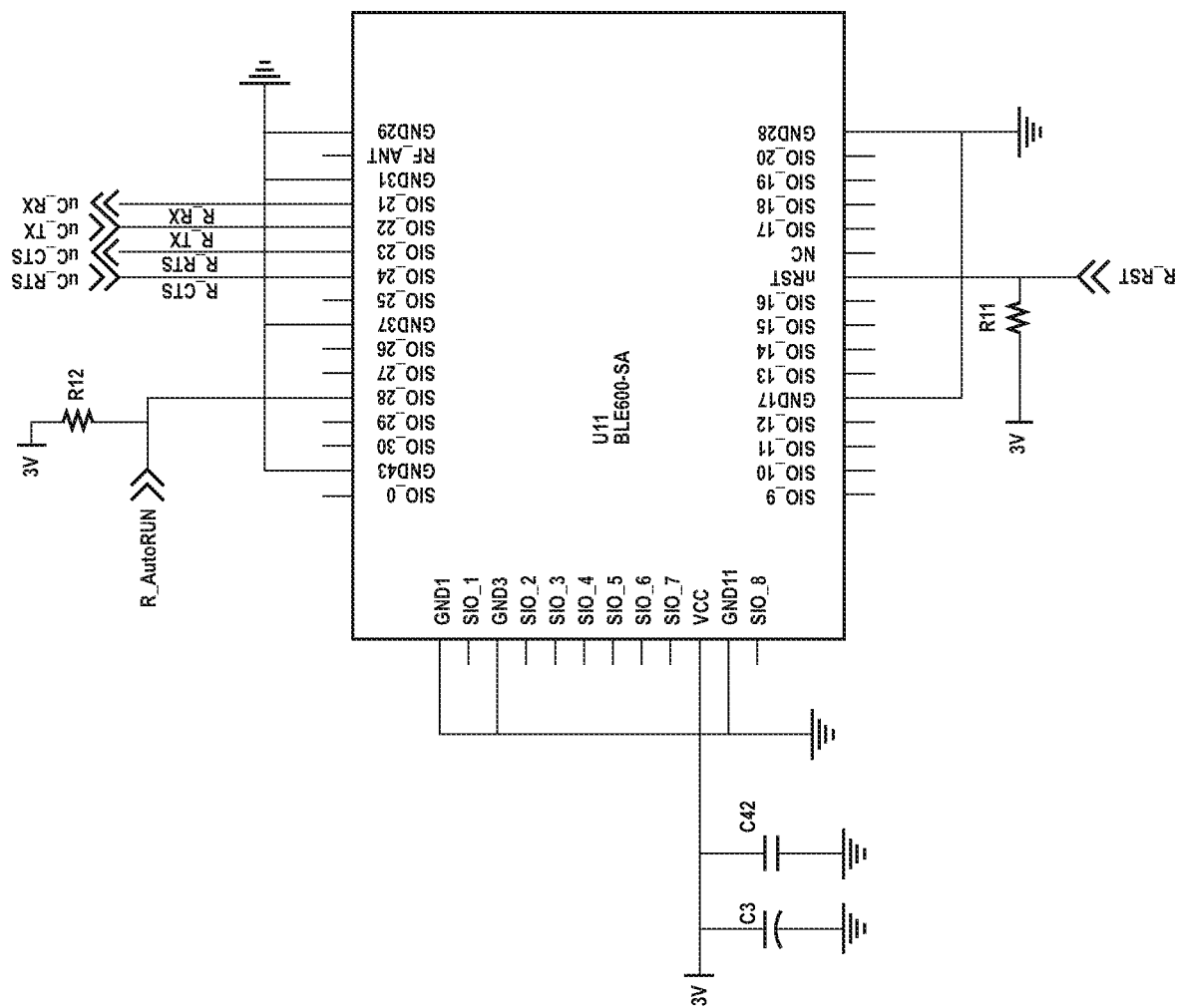
FIGS. 7-11 show a detailed schematic diagram of a digital implementation of the electronic circuitry of a device or apparatus for electro acoustic volume measurement according to the present disclosure.

FIG. 7 is a radio circuit 700 that allows wireless communication between the probe and a display. In this example, it is implemented using single-mode Bluetooth Low Energy (BLE), or Bluetooth Smart. One possible part used for the radio circuit 700 may be part BL600-SA, available from Laird PLC of London, UK. Other implementations of a radio circuit are possible, but desirably they are formed of small, portable, power-conscious devices, such as those powered by batteries.

Figure 8:
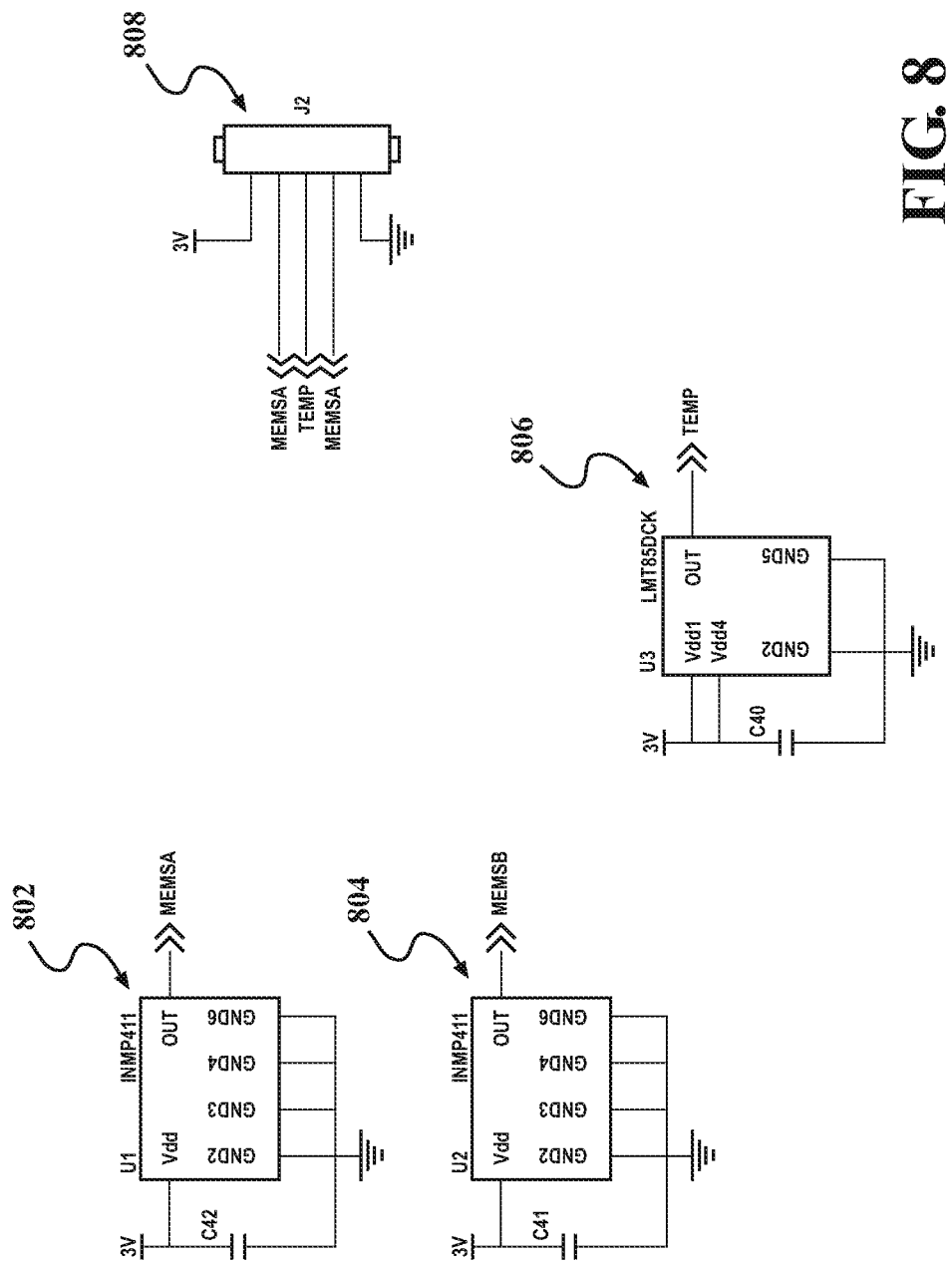

FIG. 8 shows the inputs to the digital electrical circuitry. The microphone 802 and the microphone 804 may be used as the respective microphones 202, 204 within a probe, such as the probe 102. The microphones 802, 804 produce analog outputs for use in the control circuitry for the speaker. Each microphone 802, 804 may be implemented as an omnidirectional microphone, for example part INMP411, available from InvenSense Inc. of San Jose, Calif. A temperature sensor 806, which is preferably but not necessarily an analog temperature sensor, may be used to adjust for temperature as described above. An implementation of the temperature sensor 806 shown comprises part LMT85DCK, available from Texas Instruments of Dallas, Tex. The input connector 808 makes these signals available to the rest of the digital circuitry next described.

Figure 9:
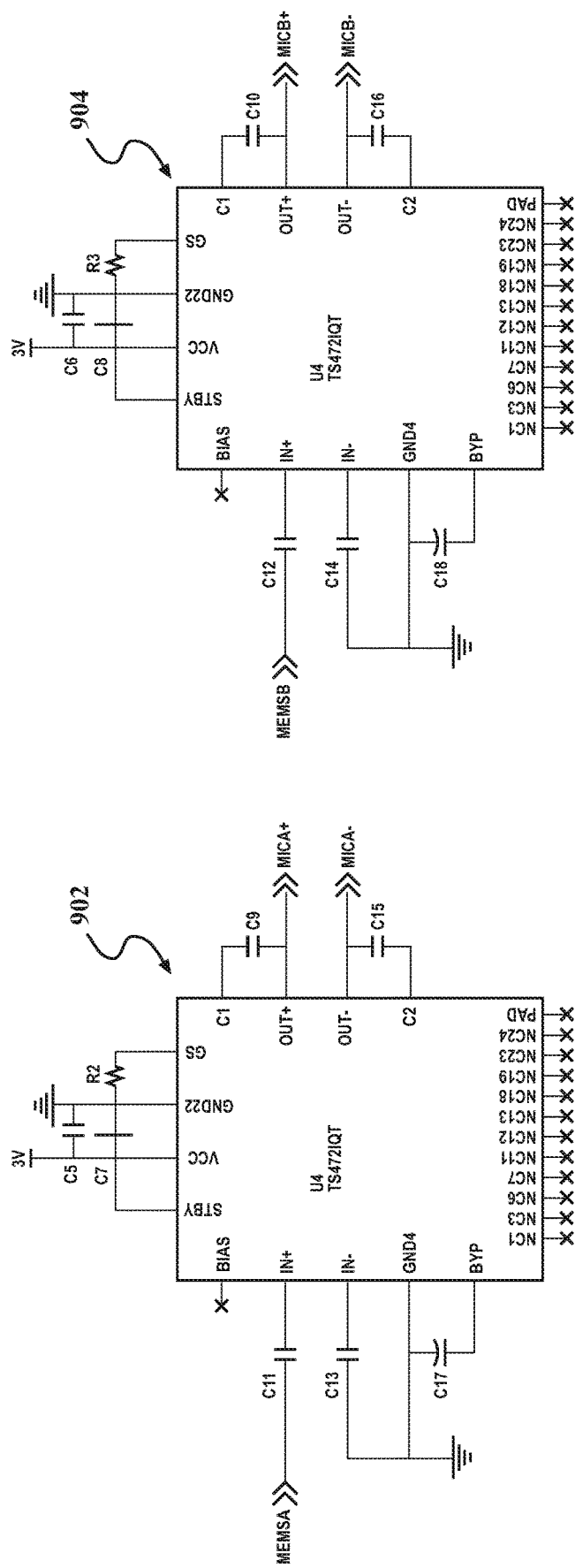

FIG. 9 includes the sense circuits for each of at least two microphones, such as the microphones 802, 804. For example, two microphone preamplifiers 902, 904 provide digital voltage values equivalent to the analog output signals of the microphones 802, 804 within the probe 102. Any component capable of providing a digital output from the microphone signals may be used. In the implementation shown, the preamplifiers 902, 904 comprise part T5472QT, available from Shenzhen Wengo Electronic Technology Co., Ltd. of Shenzhen, China. The preamplifiers 902, 904 provide digital microphone signals that can be used to determine the phase difference of the microphones 802, 804, and to use that phase difference for a VC).

Figure 10:
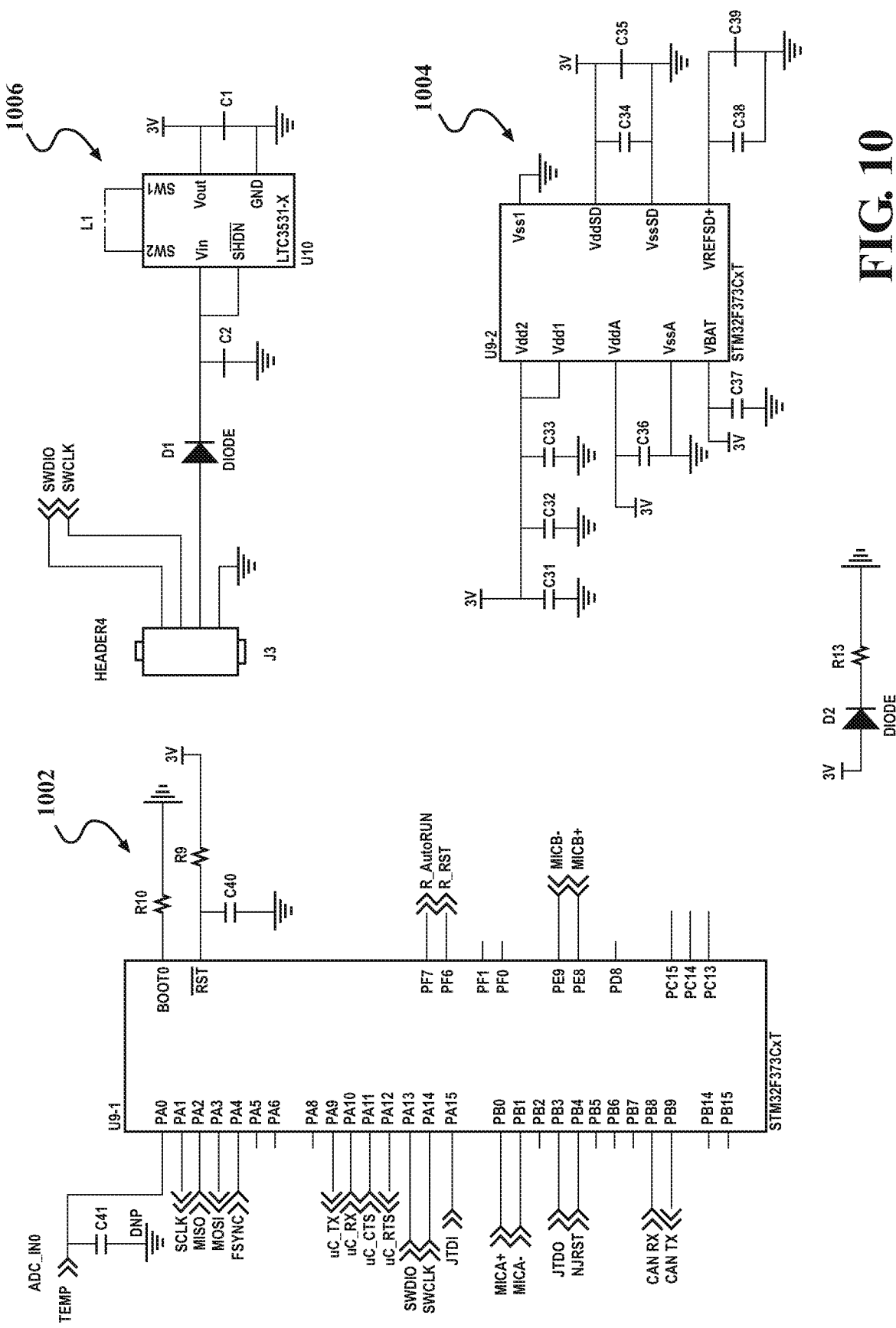

FIG. 10 includes a digital implementation of the VCO. The VCO comprises a programmable microcontroller 1002 that receives input from the preamplifiers 902, 904 and the temperature sensor 806, and produces an output control signal for a speaker, described below. The programmable microcontroller 1002 may be, for example, part STM32F373C, available from STMicroelectronics of Geneva, Switzerland. Another programmable microcontroller 1004, which may be in the same family of parts, provides a power supply for the electronic circuitry, while a switching circuit 1006 allows for switching power to the VCO (e.g., from a battery) on and off. The switching circuit 1006 includes a buck-boost synchronous DC/DC converter to regulate the voltage used by the electronic circuitry. The buck-boost synchronous DC/DC converter may be implemented by part LTC3531, available from ADI.

Figure 11:
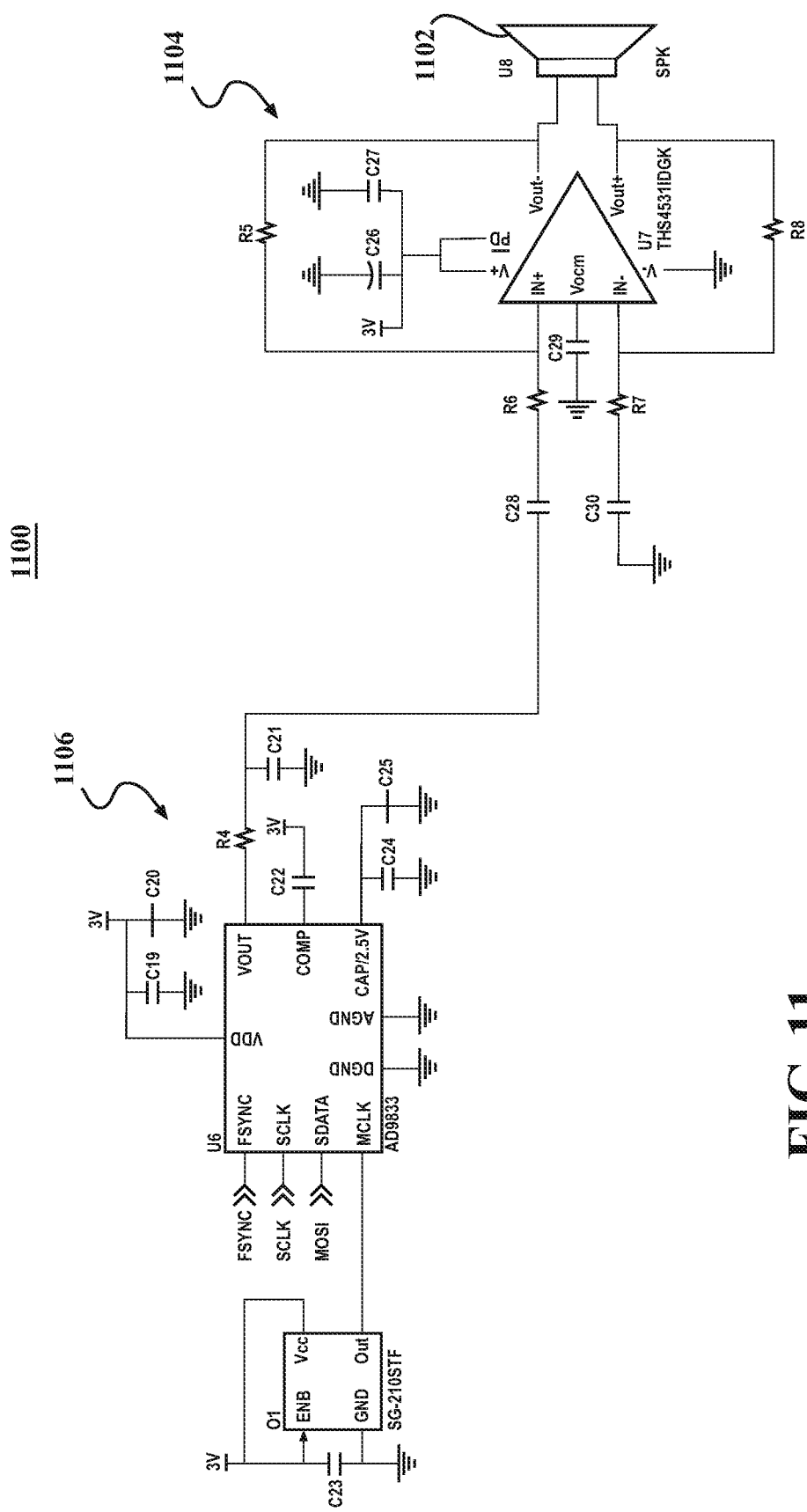

Control circuitry 1100 for the speaker 1102, which may be similar to the speaker 208, is shown in FIG. 11. The control signal for the speaker 1102 is received from a differential amplifier 1104 that receives as input a waveform produced by a programmable waveform generator 1106. The waveform is an equivalent sine wave signal to that produced at the output of the third amplifier 332. The programmable waveform generator 1106 receives input from the VCO of FIG. 10. In the example shown, the differential amplifier 1104 is implemented by part THS4531, available from Texas Instruments, and the programmable waveform generator 1106 is implemented by part AD9833, available from ADI.

One example of a use of a device or apparatus for electro acoustic volume measurement according to the present disclosure apparatus FIGS. 12, 13A, and 13B. FIG. 12 shows a perspective view of an apparatus 1202, such as the apparatus 100 of FIG. 1, inserted into a space above a piston in an internal combustion engine 1200. While the apparatus 1202 shown in FIG. 12 is wired, the probe of the apparatus 1202 may be wireless as described above. FIGS. 13A and 13B show cross-sectional, side views that illustrate measurement of the compression ratio of an internal combustion engine, such as the internal combustion engine 1200 of FIG. 12.

In use, a spark plug 1300 is unscrewed from the housing 1302 of a piston 1304. A position that represents bottom dead center (BDC) is shown in FIG. 13A, while the position that represents top dead center (TDC) is shown in FIG. 13B. The apparatus 1202 produces a first volume measurement (corresponding to a first frequency at which the 90-degree phase relationship exists) at BDC and a second volume measurement (corresponding to a second frequency at which the 90-degree phase relationship exists) at TDC. The compression ratio of the internal combustion engine 1200 equals the first volume measurement at BDC divided by the second volume measurement at TDC.

The frequency at which the 90-degree phase relationship exists is not affected by the damping of the acoustical system. Accordingly, the potential inaccuracy due to acoustic leakage in the volume container is reduced. Further, the seal formed by the apparatus with the enclosed space displays stability and precision due to a lack of air turbulence. The pseudo-resonant frequency is dependent on the spacing between two microphones and not the total length of the pipe. In one example, this feature enables the measurement of volumes between 10 and 1200 cc while keeping the frequency between 30 and 400 Hz in a practical-sized portable instrument.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. An apparatus for electro acoustic volume measurement of a gas in a housing, comprising:
   a hollow tube having a first end and a second end;
   a speaker arranged to emit audio signals through the hollow tube;
   at least two microphones, a first microphone of the at least two microphones located at the first end of the hollow tube, and a second microphone of the at least two microphones located a defined distance towards the second end from the first microphone within the hollow tube; and a voltage-controlled oscillator that controls a frequency of the audio signals to a resonance frequency where signals of the first microphone and signals of the second microphone are 90 degrees out of phase while the first end of the hollow tube is located within the housing, the resonance frequency indicating a volume of the gas.

2. The apparatus of claim 1, wherein the speaker is mounted in a housing in acoustical connection with the second end.

3. The apparatus of claim 2, wherein the speaker is one of multiple speakers electrically wired in at least one of series or parallel.

4. The apparatus of claim 2, wherein the housing comprises an opening into which the second end of the hollow tube is affixed.

5. The apparatus of claim 1, further comprising:
a temperature sensor providing an input signal to adjust the volume based on a temperature within the housing.

6. The apparatus of claim 5, wherein the temperature sensor is mounted within a housing of the speaker.

7. The apparatus of claim 1, further comprising:
a rigid wire extending through the hollow tube to which the at least two microphones are affixed.

8. The apparatus of claim 1, further comprising:
a housing for electronic circuitry controlling the speaker, the electronic circuitry including the voltage-controlled oscillator; and
a connector coupled to a housing for the speaker and to the housing for the electronic circuitry.

9. The apparatus of claim 1, further comprising:
a waveform generator that receives a voltage signal proportional to a frequency between the signals of the first microphone and the signals from the second microphone, and generates a waveform input for the voltage-controlled oscillator.

10. The apparatus of claim 9, wherein the waveform input comprises a triangular wave.

11. The apparatus of claim 1, wherein the voltage-controlled oscillator comprises a programmable microcontroller.

12. An apparatus for electro acoustic volume measurement of a gas within a housing, comprising:
a probe, comprising:
a hollow tube having a first end and a second end;
a speaker arranged to emit audio signals through the hollow tube from the second end;
a first microphone located at the first end of the hollow tube; and
a second microphone located within the hollow tube a defined distance towards the second end from the first microphone; and
electronic circuitry, comprising:
a voltage-controlled oscillator that controls a frequency of the audio signals to a resonance frequency where signals of the first microphone and signals of the second microphone are 90 degrees out of phase while the first end of the hollow tube is located within the housing, wherein respective values of the resonance frequency correspond to different volumes for the gas.

13. The apparatus of claim 12, wherein the electronic circuitry further comprises:
a first amplifier circuit coupled to the first microphone and producing a first amplified signal;
a second amplifier circuit coupled to the second microphone and producing a second amplified signal;
a multiplier circuit that generates a product of the first amplified signal and the second amplified signal; and
a waveform generator that generates an input signal to the voltage-controlled oscillator based on a frequency difference between the first amplified signal and the second amplified signal.

14. The apparatus of claim 12, wherein the electronic circuitry is mounted within the hollow tube.

15. The apparatus of claim 12, wherein the probe comprises:
a speaker housing supporting the speaker;
a flange about the second end of the hollow tube; and
a temperature sensor, wherein the flange is fitted into an opening in the speaker housing.

16. The apparatus of claim 15, wherein an end of the speaker housing opposite from the opening includes a connector coupled to a housing in which electronic circuitry is mounted.

17. A method for electro acoustic volume measurement of a gas in a housing, comprising:
inserting a hollow tube having a first end and a second end within the housing such that the first end of the hollow tube is located within the housing, a first microphone of at least two microphones located at the first end of the hollow tube, and a second microphone of the at least two microphones located a defined distance towards the second end from the first microphone within the hollow tube; and
emitting audio signals through the hollow tube using a speaker while controlling, by a voltage-controlled oscillator, a frequency of the audio signals to a resonance frequency where signals of the first microphone and signals of the second microphone are 90 degrees out of phase, wherein the resonance frequency indicates a volume of the gas.

18. The method of claim 17, further comprising:
adjusting the volume using a temperature value measured by a temperature sensor.

19. The method of claim 17, wherein the defined distance is between three to four cm, inclusive.

20. The method of claim 17, wherein:
the speaker comprises one speaker of a speaker array, the speaker array acoustically coupled to the second end of the hollow tube;
inserting the hollow tube comprises inserting the hollow tube in a piston housing through a spark plug opening; and
controlling the frequency of the audio signals to the resonance frequency comprises controlling the frequency to a first resonance frequency corresponding to top dead center and controlling the frequency to a second resonance frequency corresponding to bottom dead center.

* * * * *